C. FLOWERS.
SHOE FOR FURROW OPENERS.
APPLICATION FILED JUNE 27, 1917.
1,263,220.
Patented Apr. 16, 1918.
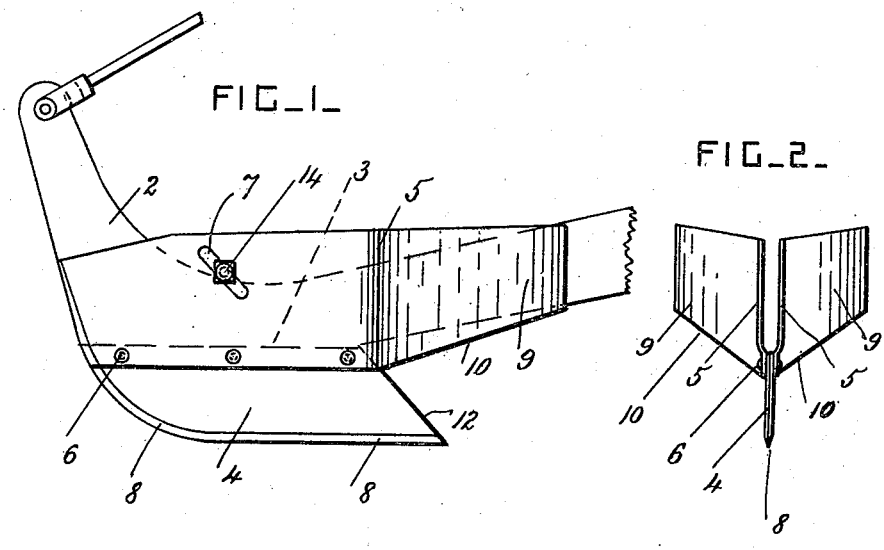
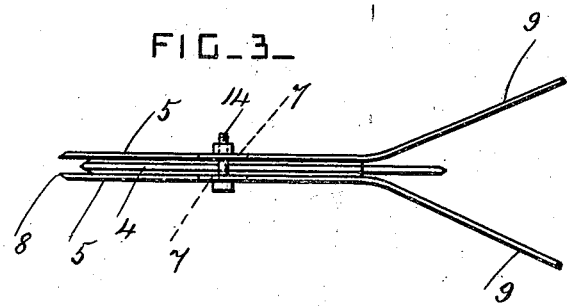

UNITED STATES PATENT OFFICE.

CLIFFORD FLOWERS, OF CAMDEN, OHIO.

SHOE FOR FURROW-OPENERS.

1,263,220.

Specification of Letters Patent. Patented Apr. 16, 1918.

Application filed June 27, 1917. Serial No. 177,258.

*To all whom it may concern:*

Be it known that I, CLIFFORD FLOWERS, a citizen of the United States, residing at Camden, in the county of Preble and State of Ohio, have invented certain new and useful Improvements in Shoes for Furrow-Openers; and I do hereby declare the following to be a full, clear, and exact description of the invention, such as will enable others skilled in the art to which it appertains to make and use the same.

This invention relates to repair shoes adapted to be attached to the worn furrow openers of agricultural implements such as corn planters; and it consists in the novel construction and combination of the parts hereinafter fully described and claimed.

In the drawings, Figure 1 is a side view of a portion of a furrow opener provided with a repair shoe according to this invention. Fig. 2 is a front end view, and Fig. 3 is a plan view, of the repair shoe.

The furrow opener or runner 2 is a curved blade of any approved form and construction such as used on various agricultural implements, and more particularly on corn planters. When such a furrow opener has been in use for some time its bottom edge 3 becomes worn away and flattened. An auxiliary blade 4 is provided and has a pair of side plates 5 secured to its upper part. These side plates are permanently secured to it by rivets 6, or in any other approved way, such as by welding them in place. These side plates are spread apart or offset a little so that they can be slipped over and straddle the furrow opener 2, as shown in Fig. 1.

A single pair of slots 7 is formed in the upper front part of the pair of side plates, and these slots are arranged so that they are inclined upwardly and forwardly of the blade 4. A clamping bolt 14 is arranged in the slots for securing the shoe to the furrow opener. The front end of the blade 4 and the front ends of the side plates are curved to correspond with the curvature of the furrow opener 2, and they are provided with cutting edges 8 which extend along them and the bottom of the blade 4.

The rear end portions of the side plates project beyond the rear end of the blade 4, and they are inclined laterally so as to form furrow-spreading wings 9, and the bottom edges 10 of these wings are inclined upwardly and rearwardly from their point of junction with the blade 4. The rear end 12 of the blade 4 is inclined downwardly and rearwardly from the bottom of the wings 9.

This shoe is adapted to be applied to all makes of planter furrow openers, and is adapted to renew them so that they will work like new. No holes or slots have to be formed in the original furrow opener for the attachment of the shoe. The inclination and arrangement of the slots prevents the clamping bolt from working loose. The furrow-spreading wings are provided and are formed with the inclined edges 10 so as to spread the soil and allow the fine particles of soil to thereafter fall back into the furrow, as the grain is dropped into it, to assist in filling the furrow and in covering the grain.

What I claim is:

A repair shoe for a furrow opener, comprising a cutting blade having an upwardly and forwardly inclined rear end, a pair of side plates secured to the said blade and having diverging wings at their rear parts which project from the point of junction of the side plates with the rear end of the cutting blade and which have upwardly and rearwardly inclined lower edges which form an acute angle with the inclined rear end of the cutting blade and which permit the fine particles of soil to fall back into the furrow behind the cutting blade, and means for securing the said side plates to a furrow opener.

In testimony whereof I have affixed my signature.

CLIFFORD FLOWERS.

Copies of this patent may be obtained for five cents each, by addressing the "Commissioner of Patents, Washington, D. C."